D. C. GILLETT.

APPARATUS FOR PRESERVING ORGANIC MATERIALS BY THE USE OF X-RAYS.

APPLICATION FILED APR. 14, 1917.

1,275,417. Patented Aug. 13, 1918.

Witness
Edwin J. Beller.

Inventor
D. C. Gillett,
by Wilkinson, Giusta & Mackaye,
Attorneys.

D. C. GILLETT.
APPARATUS FOR PRESERVING ORGANIC MATERIALS BY THE USE OF X-RAYS.
APPLICATION FILED APR. 14, 1917.
1,275,417. Patented Aug. 13, 1918.
4 SHEETS—SHEET 2.
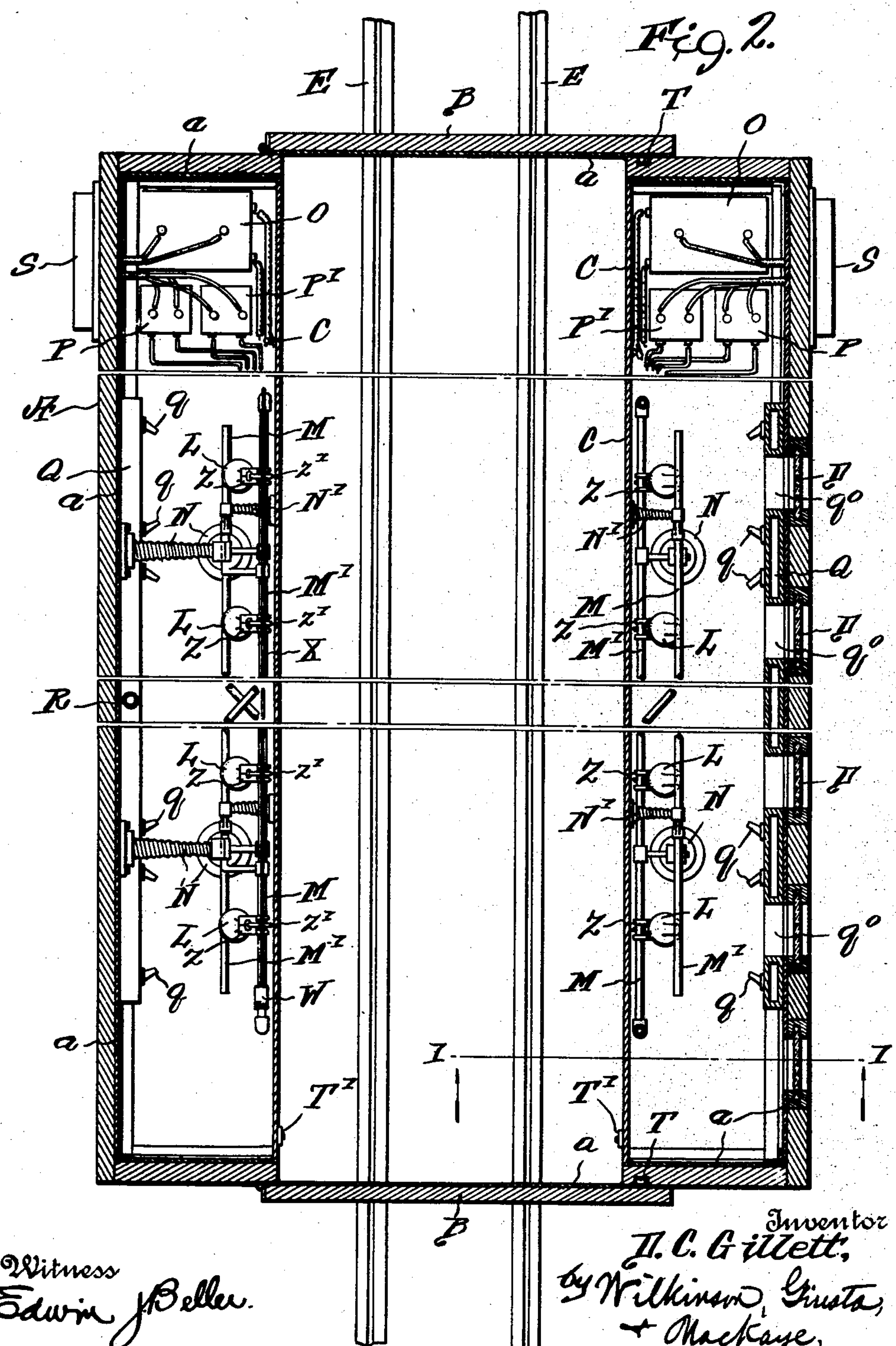

D. C. GILLETT.
APPARATUS FOR PRESERVING ORGANIC MATERIALS BY THE USE OF X-RAYS.
APPLICATION FILED APR. 14, 1917.
1,275,417. Patented Aug. 13, 1918.
4 SHEETS—SHEET 3.
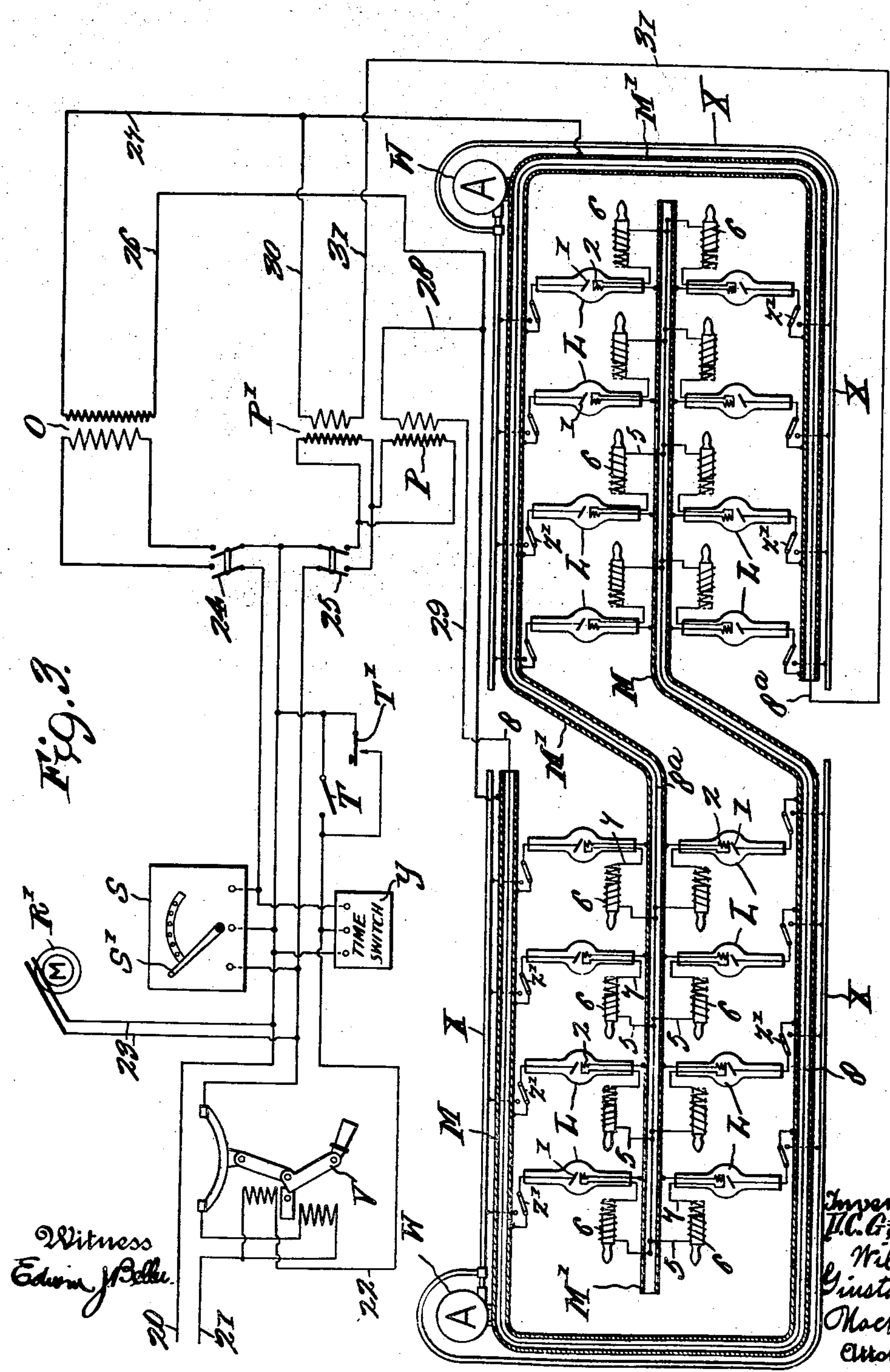

D. C. GILLETT.
APPARATUS FOR PRESERVING ORGANIC MATERIALS BY THE USE OF X-RAYS.
APPLICATION FILED APR. 14, 1917.
1,275,417. Patented Aug. 13, 1918.
4 SHEETS—SHEET 4.
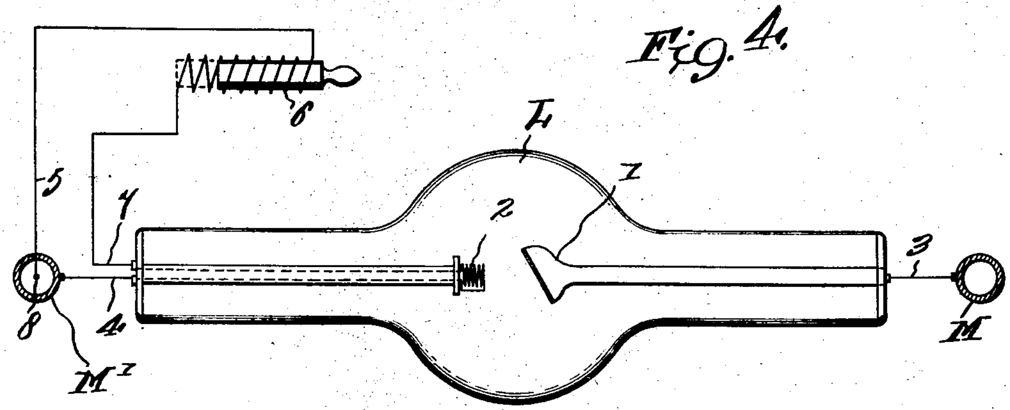
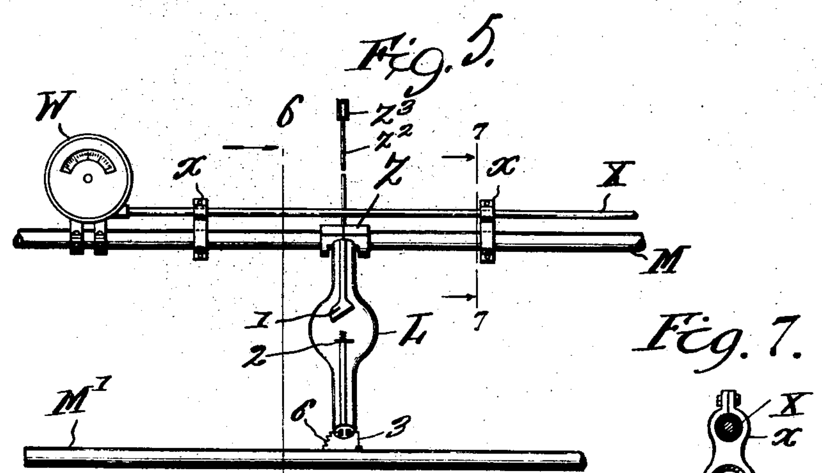
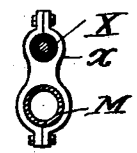
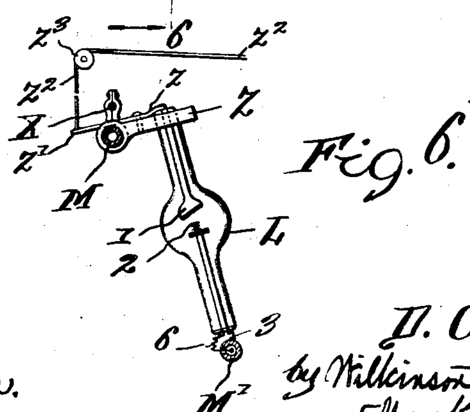
Witness
Edwin J Beller.
Inventor
D. C. Gillett,
by Wilkinson, Giusta & Mackaye,
Attorneys.

UNITED STATES PATENT OFFICE.

DAVID COLLINS GILLETT, OF TAMPA, FLORIDA.

APPARATUS FOR PRESERVING ORGANIC MATERIALS BY THE USE OF X-RAYS.

1,275,417. Specification of Letters Patent. Patented Aug. 13, 1918.

Application filed April 14, 1917. Serial No. 162,068.

*To all whom it may concern:*

Be it known that I, DAVID COLLINS GILLETT, a citizen of the United States, residing at Tampa, in the county of Hillsborough and State of Florida, have invented certain new and useful Improvements in Apparatus for Preserving Organic Materials by the Use of X-Rays; and I do hereby declare the following to be a full, clear, and exact description of the invention, such as will enable others skilled in the art to which it appertains to make and use the same.

The purpose of this invention is either to destroy utterly any destructive insects or other animal life that would tend to destroy perishable articles, or to sterilize these insects and prevent the further propagation of their species, and also to destroy any eggs that they may have already laid.

In certain instances, such as in the treatment of furs, or woolen articles, or feathers, it is desirable to destroy the moth or other destructive insect before it can do the damage. With other perishable articles, such as grains, the few weevils or other insects that may be found initially in the grain will do little damage to the grain, provided their powers of reproduction are annihilated, and the eggs already laid are sterilized.

Again it is well known that trichina, which infest raw pork are in themselves harmless to human life; but that the second generation, when bred in the human system after eating raw pork, becomes very dangerous to human life; and, therefore, in the case of the raw pork, or of the grain, it will only be necessary to destroy the fertility of the original insect to in a large measure prevent any material injury from the presence of such insect.

This invention is intended to provide an apparatus that will economically generate in a large quantity and satisfactorily distribute large quantities of X-rays, and which is provided with means for so varying the dosage as to attain the various results desired, without any unnecessary waste of time or expense in connection with the treatment.

The invention is especially applicable to the treatment of food products, either of vegetable or animal origin, furs, woolens, feathers, books, manuscripts, legal documents, or the like, tobacco or tobacco products and many other organic materials, which are likely to become injured or destroyed by the presence of destructive animal life. As before stated, this destruction may be brought about either by immediately killing the destructive insect, no matter in what stage of its life's cycle it may be found, or by sterilizing the insect and preventing its reproduction through the destruction of its reproductive faculties, or through the sterilization of its eggs, whether these eggs be previously or subsequently laid.

According to my invention, the material to be treated is run into the treatment chamber in bulk, and is there subjected to the action of a plurality of X-ray tubes. In this treatment the perishable articles may be treated in the loose state, or bound in bales, or preferably in insect-proof containers of material highly permeable to X-rays, such as cedar or other wooden chests, paper bags treated with paraffin, or any other suitable envelop, which permits the free passage of the X-rays and is not likely to be affected by the treatment, or to injure the contents of the package.

My invention will be more clearly understood after reference to the accompanying drawings, in which the same parts are indicated by similar reference symbols throughout the several views, and in which:

Fig. 2 shows a section along the broken line 2—2 of Fig. 1, and looking down.

Fig. 3 is a diagram showing the electrical connections for two groups each of eight X-ray tubes, with the other electrical apparatus used in connection therewith.

Fig. 4 is a diagram showing the operation of each individual tube.

Fig. 5 is a diagram showing the means whereby the current going through the X-ray tubes may be measured independently by a single ammeter;

Fig. 6 shows a section along the line 6—6 of Fig. 5, and looking in the direction of the arrows; and Fig. 7 shows a cross section through the metal frame and adjacent bus bar along the line 7—7 of Fig. 5 and looking in the direction of the arrows, the parts being shown on a larger scale than in Fig. 5.

Figure 1:
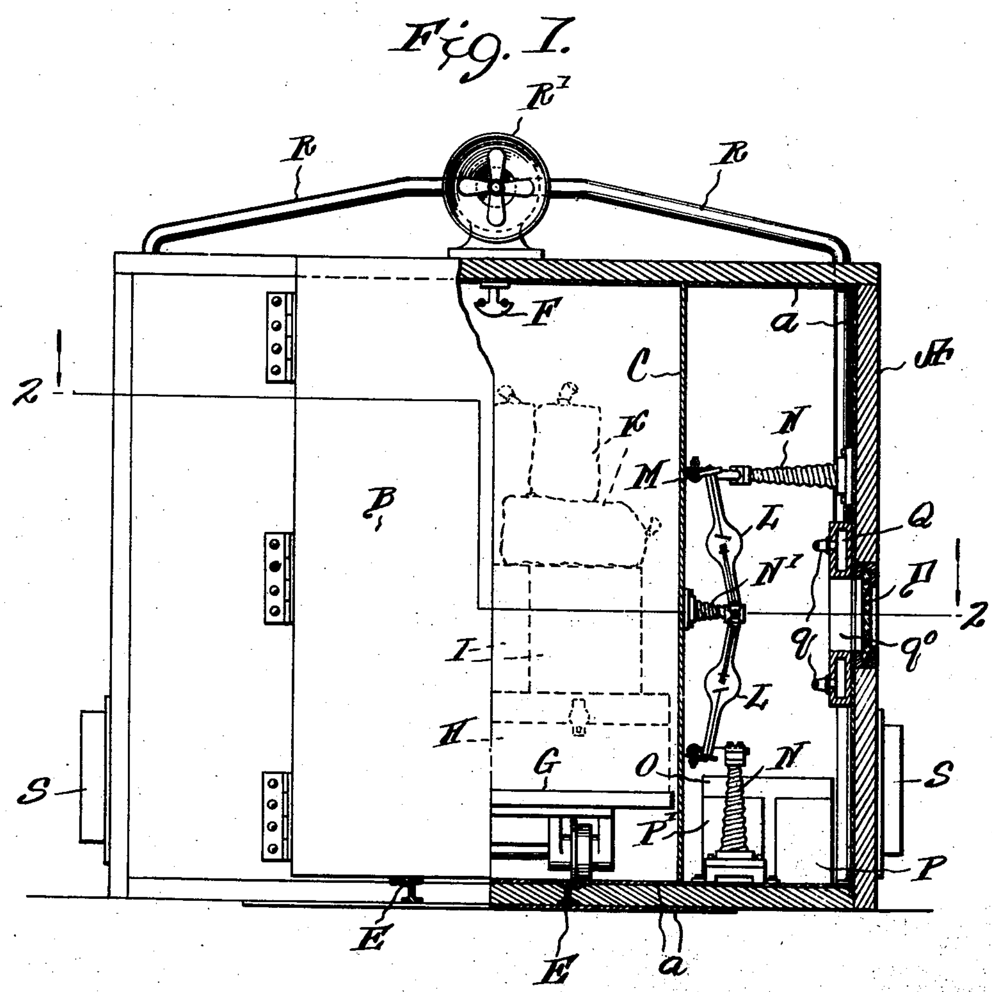
Figure 1 is a sectional elevation showing an end view of the complete apparatus, parts being shown in section along the line 1—1 of Fig. 2, and looking in the direction of the arrows.

A represents a closed chamber having doors B at each end thereof, which chamber and doors are lined with metallic lead *a*, with the thickness of $\frac{1}{8}$ of an inch, or more or a lead compound containing an equivalent amount of metallic lead. This chamber is separated by the partitions C into a central treatment chamber, and side chambers containing the X-ray apparatus, including the X-ray tubes, transformers, etc., which will be hereinafter called the tube chambers.

These partitions C should be made of wood fiber, wood, or other material, highly permeable to the X-rays, and these partitions are mainly intended as a protection to the X-ray apparatus, and also as protection to such operators, as are required from time to time to go into the treatment chamber, against contact with such apparatus.

Windows are located at suitable intervals in the outer walls of the tube chambers for convenience in inspecting the interior of the chambers. These windows are provided with heavy glass panes D made of glass containing lead in quantities sufficient to be the equivalent to at least $\frac{1}{8}$ of an inch of metallic lead per unit of surface. These panes will permit the inspection of the interior of the tube chamber; but at the same time will occlude the X-rays.

I may provide tracks E, running into the chamber, or an over-head trolley arrangement F, or both, as shown in Fig. 1, for convenience of transporting the material to be treated into and out of said chamber.

Where tracks are used, a suitable truck G is provided, as shown in Fig. 1, on which the materials or the packages containing the same are placed.

I have shown the goods placed in wooden chests H, wooden boxes I, and bags K of paper or textile stuff, all of which are readily permeable to X-rays.

The X-ray tubes L are symmetrically arranged in groups, as shown, and mounted in oppositely disposed pairs connected to a tubular frame, preferably composed of two sections M and M′ symmetrically disposed relative to each other, and attached to the side walls and bottom of the tube chambers by suitable insulators N and N′.

This frame is preferably made of stiff hollow iron piping free from sharp angles, and between the two sections of the frame the X-ray tubes are suspended, being arranged in multiple and in oppositely disposed pairs, as shown in Figs. 1 and 3.

The tubes L are preferably set at an angle, as shown in Fig. 1, so as to better disperse the X-rays through the treatment chamber.

There is one step-up transformer O for supplying high potential current to the X-ray tubes, the current preferably being transformed from the city mains, at say 220 volts, to approximately 100,000 volts; while there are two step-down transformers P and P′, to generate low potential current for heating one of the terminals of the X-ray tubes, for directing the high potential current in one direction only across the same.

In these step-down transformers P and P′ the current is generated at approximately 10 volts. The electric circuits from the step-up and step-down transformers will be hereinafter more fully described in connection with other parts of the electric system.

While only one high tension transformer is required, two low tension transformers are used, each one being connected to one element only of the high tension system, as shown in Fig. 3, in order to prevent short circuiting of current from the high tension transformer through the coils of the low tension transformers.

The secondary of the low tension transformer is insulated from the primary of the same for 100,000 volts or more, in order to prevent leakage of the high tension currents to the primary lines. All transformer cases are grounded.

In order to cool the X-ray tubes, boxes or manifolds Q are provided, which are supplied with air through the pipes R from the blower R′ (see Fig. 1). This blower should be preferably driven by electric current from the common source of electricity for the other parts of the apparatus, say the city mains. Each of these manifolds is provided with a series of nozzles $q$, which are preferably inclined slightly so as to blow the air at an angle relative to the heated portions of the X-ray tubes, and thus cause a vortical motion of the air, which will cause it to circle around and heat all parts of the tubes rather than cooling one side only. These manifolds are cut away as at $q^{\circ}$, see Fig. 2, opposite the various windows so that they will not obstruct the vision through the glass panes D.

Switch boards S are provided outside of the chamber, whereby the electric apparatus within the chamber may be controlled.

In order to protect the operators against possible injury, each door is provided with a door jamb switch T, which is opened when the door is closed and which is closed when the door is opened; which switch operates a shunt circuit, which throws the circuit breaker.

As an additional protection for the operators, a release switch T′ is provided on the inside of the treatment chamber, at or near each door, whereby any operator, inclosed within the treatment chamber, may close the shunt circuit and throw the circuit breaker, thus cutting off the current from the X-ray tubes.

As a further protection to the operators and to the machine, an over-load circuit breaker V is provided.

The flow of high tension current through the tubes is controlled through change of temperature of the hot filament. In order to regulate the current flowing through these filaments and consequently the temperature of same, a suitable device consisting of a variable magnetic reluctance is put in series with the filament circuit of each tube. This device is mounted on the high tension conductor frame, each tube being provided with a separate device in order that delicate regulation of the filament current may be secured and such regulation be that most suitable to the individual tube. In this way individual regulation is secured instead of common regulation for a group of tubes. In order to obtain a reading of the high tension current passing through each tube a milli-ammeter is provided for each bank of tubes, regardless of the number of tubes in such bank, and a separate bus bar is attached to, but insulated from the high tension conductor frame. Each tube is provided with a spring switch, through the manipulation of which, by a cord leading to the outside of the chamber, the high tension current may be diverted through the bus bar and the meter, thence back into the high tension conductor frame. On release of the string or cord the high tension current flows directly from the tube into the high tension conductor frame. This arrangement permits of individual readings being taken from each tube in the group, no matter of how many tubes each group may consist.

This bus bar arrangement is shown in Fig. 3, and in detail in Figs. 5 and 6, where X represents the bus bar, which may be continuous, or divided into a series of sections electrically connected together. This bus bar is spaced apart from the two sections M and M′ of the main frame by suitable insulators $x$, and leads into the ammeter W. Two bus bars and two ammeters, one for each group are shown.

The bus bar X is connected by the metal clamp X′ to the metal frame M, but is insulated from the said clamp and frame by the bushing $x$ of any suitable insulating material.

Each X-ray tube L is connected at one end to an insulating arm Z, carried by the corresponding member of the main frame, and this insulating arm carries the spring contact strip $z$, see Fig. 6, which normally closes the high tension circuit through the frame and the tube. This strip has a free end $z'$ connected to the cord $z^2$, which is led to any convenient point for manipulation, as over the pulley $z^3$. There is one of these cords for each one of the tubes in the system, and by pulling up on any one of these cords $z^2$, the contact arm $z'$ will be shifted from the main frame to the bus bar, and the current through that particular tube will pass from the main frame to the ammeter and then through the bus bar to the tube, and the reading of the ammeter may be taken for that particular tube.

In a similar way the readings may be taken for each individual tube in the system.

A suitable oil immersed, motor driven time switch Y is also provided, which is set to run for any predetermined period before operating the shunt release of the circuit breaker; but such switches are well known in the art and do not constitute a part of my present invention.

The electric connections for each individual X-ray tube are shown in Fig. 4, in which 1 represents the anode, preferably made of a single piece of tungsten alloy, or solid tungsten, and 2 represents the cathode, which is preferably in the form of a coil of tungsten wire. The low tension current should be turned on to the tube an instant before the high tension current is turned on so that the cathode may be heated when the high tension circuit is closed, whereby the said high tension current will be caused to flow through the tube in one direction only. The high tension current passes to the anode through the conductor 3, and leaves the cathode through the conductor 4. The low tension heating current for the cathode traverses the conductor 5, which passes around the varying inductance 6, and enters the tube by the wire 7, and passing through the cathode coil 2 returns by the high tension conductor 4 to the cable 8 inclosed in one of the hollow pipes M or M′ of the main frame. The heating current being alternating passes through the coil 2, heating the same, and the quantity of this current would be controlled by the varying inductance coil 6. This would control the temperature of the cathode and would consequently regulate the flow of current across the gap in the X-ray tube.

In order to prevent corona loss from the high tension conductors and to lessen the danger of spark over, one of the terminals of the heating current for each cathode is connected to a cable 8 or $8^a$, which is inclosed within the hollow tubing constituting the frame work of the system, and the other terminal of the heating circuit for each X-ray tube is connected to the pipe surrounding said cable, as shown in Figs. 3 and 4.

The wiring diagram and arrangement of electric conductors is shown in Fig. 3, in which the current comes in from the source of supply, such for instance as the city mains, through the conductors 20 and 21. 22 represents a shunt circuit; 23 represents a branch circuit from the mains for driving the blower R′; 24 represents a double pole switch for connecting the mains to the high tension transformer; and 25 represents a double pole switch for connecting the mains to the low tension transformers. 26 represents the conductor leading from the high tension transformer to the member M of the main conductor frame; and 27 represents the conductor connecting the other terminal of the high tension transformer to the opposite member M′ of the main conductor frame. 28 represents the conductor connecting one terminal of the low tension transformer P to the element M of the main conductor frame; and 29 represents the conductor connected to the insulated cable 8, which passes through the member M of the main conductor frame, and is connected to the cathodes of the right hand group of X-ray tubes. 30 represents the conductor from one terminal of the low tension transformer P′, which is connected to the member M′ of the main conductor frame and 31 represents the conductor from the opposite terminal of the low tension transformer P′, connected to the cable $8^a$ inclosed in the pipe M′, and connected to the cathodes of the lefthand group of X-ray tubes.

Referring to the diagram shown in Fig. 3, V represents a circuit breaker, which may be operated either by the shunt circuit or overload. S represents the switch board; S′, the controller handle; Y, the time switch; T, the door jamb switch; and T′, the door safety switch. z′—z′ represent the contact strips for normally closing the circuit through the X-ray tubes; but which may be shifted to the bus bar for each X-ray tube, whereby a reading of the ammeter for each individual tube may be obtained,—all as already described.

While I have shown in the diagram the electrical connections for one tube chamber only, and for the doors, switch and safety switch at one door only, it will be obvious that the same might be duplicated for two tube chambers, and at the opposite door, when it is desired to run the materials being treated through the treatment chamber, as shown in Fig. 2.

The operation of the apparatus is as follows:

The material is carried into the treatment chamber in any convenient way, as on the truck, shown in Fig. 1, the doors are then closed, the low tension current is first turned on for an instant to heat up the cathodes, and then the high tension current is turned on, which passes through the anodes to the cathodes of the tubes and generates the X-rays.

As the door is closed, the shunt circuit to the circuit breaker will be automatically broken. The time for the treatment depends upon the nature of the material being treated, as hereinbefore explained, and this time is preferably determined by a time switch, which is so arranged as to automatically break the circuit at the end of the time interval for which the switch is set.

While there can be no injury to the materials being treated, occurring from too long exposure to the X-rays, it is desirable from an economical standpoint to stop this treatment at the end of the shortest time in which efficient action can be secured, and by having a time switch of the character described any waste of time or current on the part of careless operators is avoided.

After the material has been treated for the desired time, the circuit will be broken and the doors may be opened, the material removed from the treatment chamber and fresh material inserted.

If at any time, it is desired to suspend the treatment, the current might be cut off by the controller handle S′. This is an ordinary resistance control box and is not a part of my invention. Any suitable arrangement may be used if desired. The mere opening of one of the doors will also automatically close the door switch, and thereby close the shunt circuit, which will throw the circuit breaker and break the main circuit.

If the door is closed and a man is imprisoned while the high tension current is on, by closing the release switch T′, the shunt circuit is closed, operating the circuit breaker and cutting off the high tension current. The circuit breaker also breaks the circuit when there is an over-load.

It will be noted that the tubes are symmetrically disposed between the two parts of the main conducting frame, and in order to secure maximum efficiency, it is desirable that the number of tubes may be symmetrically disposed, so that both sides of the transformer waves may be used. The tubes are shown as arranged in oppositely disposed pairs set at an obtuse angle to each other; but they may be otherwise grouped as may be desired, the idea being to secure the maximum effect in the treatment chamber.

The tubes are shown as operated in multiples, and each bank of tubes may contain as many pairs of units as desired, thus by simply extending the main conducting frame, the treatment chamber may be lengthened as well.

While I have shown the tubes as arranged in two tube chambers on opposite sides of a central treatment chamber, which will insure highly efficient and speedy results, since the articles being treated are subjected to the X-rays from both sides; if desired the tubes may be arranged at one side only of the treatment chamber; but I prefer to have the same on both sides.

It is well known in the art that the high tension currents will not flow from a hot electrode to a cold electrode, and consequently by heating up one of the electrodes, as the cathode, the tubes thus serve to rectify the current; but other practical means may be devised by which the rectified current is caused to pass through the tubes without any essential action on the part of the tubes themselves in such rectification.

It will be seen that in the herein described apparatus, the quantity of dosage of the X-rays may be varied to suit the varying requirements. Thus where it is required to kill the insect the full power of the apparatus may be employed, and where it is only desired to sterilize the insects or their eggs much less dosage is needed; and thus the apparatus suits itself to the treatment of the various articles hereinbefore stated and many others of organic nature, which it is not necessary to mention.

It will be obvious that various modifications might be made in the herein described apparatus and in the construction, combination and arrangement of parts which could be used without departing from the spirit of my invention.

Having thus described my invention, what I claim and desire to secure by Letters Patent of the United States is:

1. Apparatus for the treatment of organic materials by X-rays, comprising a closed chamber having its walls impervious to X-rays, and containing a central treatment chamber, with a tube chamber at each side thereof with partitions highly permeable to X-rays separating the treatment chamber from the tube chambers, a plurality of X-ray tubes mounted in each of said tube chambers, a source of alternating current of electricity, transformers connected thereto, and conductors from said transformers to said X-ray tubes, substantially as described.

2. Apparatus for the treatment of organic materials by X-rays, comprising a closed chamber having its walls impervious to X-rays, and containing a central treatment chamber, with a tube chamber at each side thereof, with partitions highly permeable to X-rays separating the treatment chamber from the tube chambers, a door normally closing said treatment chamber, a plurality of X-ray tubes mounted in each of said tube chambers, a source of alternating current of electricity, transformers connected thereto, conductors from said transformers to said X-ray tubes, a circuit breaker located in the main low tension line and operated by overload, a shunt circuit for also operating said circuit breaker, and a switch automatically operated on the opening of the door for closing said shunt circuit, substantially as described.

3. Apparatus for the treatment of organic materials by X-rays, comprising a closed chamber having its walls impervious to X-rays, and containing a central treatment chamber, with a tube chamber at each side thereof, with partitions highly permeable to X-rays separating the treatment chamber from the tube chambers, a door normally closing said treatment chamber, a plurality of X-ray tubes mounted in each of said tube chambers, a source of alternating current of electricity, transformers connected thereto, conductors from said transformers to said X-ray tubes, a circuit breaker located in the main low tension line and operated by overload, a shunt circuit for also operating said circuit breaker, and a switch automatically operated on the opening of the door for closing said shunt circuit, with a relief switch mounted on the interior of said chamber and adapted to close said shunt circuit, substantially as described.

4. Apparatus for the treatment of organic materials by X-rays, comprising a closed chamber having its walls impervious to X-rays, and containing a central treatment chamber, with a tube chamber at each side thereof with partitions highly permeable to X-rays separating the treatment chamber from the tube chambers, a plurality of X-ray tubes mounted in each of said tube chambers, a blower, manifolds located in said tube chambers and receiving air from said blower, nozzles from said manifold for blowing air on said tubes, a source of alternating current of electricity, transformers connected thereto, and conductors from said transformers to said X-ray tubes, substantially as described.

5. Apparatus for the treatment of organic materials by X-rays, comprising a closed chamber having its walls impervious to X-rays, and containing a central treatment chamber, with a tube chamber at each side thereof, with partitions highly permeable to X-rays separating the treatment chamber from the tube chambers, a door normally closing said treatment chamber, a plurality of X-ray tubes mounted in each of said tube chambers, a blower, manifolds located in said tube chambers and receiving air from said blower, nozzles from said manifold for blowing air on said tubes, a source of alternating current of electricity, transformers connected thereto, conductors from said transformers to said X-ray tubes, a circuit breaker located in the main low tension line and operated by overload, a shunt circuit for operating said circuit breaker, and a switch automatically operated on the opening of the door for closing said shunt circuit, substantially as described.

6. Apparatus for the treatment of organic materials by X-rays, comprising a closed chamber having its walls impervious to X-rays, and containing a central treatment chamber, with a tube chamber at each side thereof, with partitions highly permeable to X-rays separating the treatment chamber from the tube chambers, a door normally closing said treatment chamber, a plurality of X-ray tubes mounted in each of said tube chambers, a blower, manifolds located in said tube chambers and receiving air from said blower, nozzles from said manifold for blowing air on said tubes, a source of alternating current of electricity, transformers, connected thereto, conductors from said transformers to said X-ray tubes, a circuit breaker located in the main low tension line and operated by overload, a shunt circuit for also operating said circuit breaker, and a switch automatically operated on the opening of the door for closing said shunt circuit, with a relief switch mounted on the interior of said chamber and adapted to close said shunt circuit, substantially as described.

7. Apparatus for the treatment of organic materials by X-rays, comprising a closed chamber having its walls impervious to X-rays, and containing a central treatment chamber, with a tube chamber at each side thereof with partitions highly permeable to X-rays separating the treatment chamber from the tube chambers, a plurality of X-ray tubes mounted in each of said tube chambers, a source of alternating current of electricity, a circuit breaker operated either by overload or shunt trips, transformers connected thereto, and conductors from said transformers to said X-ray tubes, and an automatic time switch adapted to break the main electric circuit by closing the shunt trip of the circuit breaker after the lapse of a predetermined period of time, substantially as described.

8. Apparatus for the treatment of organic materials by X-rays, comprising a closed chamber having its walls impervious to X-rays, and containing a central treatment chamber, with a tube chamber at each side thereof, with partitions highly permeable to X-rays separating the treatment chamber from the tube chambers, a door normally closing said treatment chamber, a plurality of X-ray tubes mounted in each of said tube chambers, a source of alternating current of electricity, transformers connected thereto, conductors from said transformers to said X-ray tubes, a circuit breaker located in the main low tension line and operated by overload, a shunt circuit for also operating said circuit breaker, and a switch automatically operated on the opening of the door for closing said shunt circuit, and an automatic time switch adapted to break the main electric circuit by closing the shunt trip of the circuit breaker after the lapse of a predetermined period of time, substantially as described.

9. Apparatus for the treatment of organic materials by X-rays, comprising a closed chamber having its walls impervious to X-rays, and containing a central treatment chamber, with a tube chamber at each side thereof, with partitions highly permeable to X-rays separating the treatment chamber from the tube chambers, a door normally closing said treatment chamber, a plurality of X-ray tubes mounted in each of said tube chambers, a source of alternating current of electricity, transformers connected thereto, conductors from said transformers to said X-ray tubes, a circuit breaker located in the main low tension line and operated by overload, a shunt circuit for also operating said circuit breaker, and a switch automatically operated on the opening of the door for closing said shunt circuit, a relief switch mounted on the interior of said chamber and adapted to close said shunt circuit, and an automatic time switch adapted to break the main electric circuit by closing the shunt trip of the circuit breaker after the lapse of a predetermined period of time, substantially as described.

10. Apparatus for the treatment of organic materials by X-rays, comprising a closed chamber having its walls impervious to X-rays, and containing a treatment chamber, with a tube chamber at one side thereof with a partition highly permeable to X-rays separating the treatment chamber from the tube chamber, a plurality of X-ray tubes mounted in said tube chamber, a source of alternating current of electricity, transformers connected thereto, and conductors from said transformers to said X-ray tubes, substantially as described.

11. Apparatus for the treatment of organic materials by X-rays, comprising a closed chamber having its walls impervious to X-rays, and containing a treatment chamber, with a tube chamber at one side thereof, with a partition highly permeable to X-rays separating the treatment chamber from the tube chamber, a door normally closing said treatment chamber, a plurality of X-ray tubes mounted in said tube chamber, a source of alternating current of electricity, transformers connected thereto, conductors from said transformers to said X-ray tubes, a circuit breaker located in the main low tension line and operated by overload, a shunt circuit for also operating said circuit breaker, and a switch automatically operated on the opening of the door for closing said shunt circuit, substantially as described.

12. Apparatus for the treatment of organic materials by X-rays, comprising a closed chamber having its walls impervious to X-rays, and containing a treatment chamber, with a tube chamber at one side thereof, with a partition highly permeable to X-rays separating the treatment chamber from the tube chamber, a door normally closing said treatment chamber, a plurality of X-ray tubes mounted in said chamber, a source of alternating current of electricity, transformers connected thereto, conductors from said transformers to said X-ray tubes, a circuit breaker located in the main low tension line and operated by overload, a shunt circuit for also operating said circuit breaker, and a switch automatically operated on the opening of the door for closing said shunt circuit, with a relief switch mounted on the interior of said chamber and adapted to close said shunt circuit, substantially as described.

13. Apparatus for the treatment of organic materials by X-rays, comprising a closed chamber having its walls impervious to X-rays, and containing a treatment chamber, with a tube chamber at one side thereof with a partition highly permeable to X-rays separating the treatment chamber from the tube chamber, a plurality of X-ray tubes mounted in said chamber, a blower, a manifold located in said tube chamber and receiving air from said blower, nozzles from said manifold and set at an angle thereto for blowing air on said tubes, a source of alternating current of electricity, transformers connected thereto, and conductors from said transformers to said X-ray tubes, substantially as described.

14. Apparatus for the treatment of organic materials by X-rays, comprising a closed chamber having its walls impervious to X-rays, and containing a treatment chamber, with a tube chamber at one side thereof, with a partition highly permeable to X-rays separating the treatment chamber from the tube chamber, a door normally closing said treatment chamber, a plurality of X-ray tubes mounted in said tube chamber, a blower, a manifold located in said tube chamber, and receiving air from said blower, nozzles from said manifold for blowing air on said tubes, a source of alternating current of electricity, transformers mounted in said tube chamber and connected thereto, conductors from said transformers to said X-ray tubes, a circuit breaker located in the main low tension line and operated by overload, a shunt circuit for also operating said circuit breaker, and a switch automatically operated on the opening of the door for closing said shunt circuit, substantially as described.

15. Apparatus for the treatment of organic materials by X-rays, comprising a closed chamber having its walls impervious to X-rays, and containing a treatment chamber, with a tube chamber at one side thereof, with a partition highly permeable to X-rays separating the treatment chamber from the tube chamber, a door normally closing said treatment chamber, a plurality of X-ray tubes mounted in said tube chamber, a blower, a manifold located in said tube chambers and receiving air from said blower, nozzles from said manifold for blowing air on said tubes, a source of alternating current of electricity, transformers mounted in said tube chamber and connected thereto, conductors from said transformers to said X-ray tubes, a circuit breaker located in the main low tension line and operated by overload, a shunt circuit for also operating said circuit breaker, and a switch automatically operated on the opening of the door for closing said shunt circuit, with a relief switch mounted on the interior of said chamber and adapted to close said shunt circuit, substantially as described.

16. Apparatus for the treatment of organic materials by X-rays, comprising a closed chamber having its walls impervious to X-rays, and containing a treatment chamber, with a tube chamber at one side thereof with a partition highly permeable to X-rays separating the treatment chamber from the tube chambers, a plurality of X-ray tubes mounted in each of said tube chambers, a source of alternating current of electricity, transformers mounted in said tube chamber and connected thereto, and conductors from said transformers to said X-ray tubes, a circuit breaker and an automatic time switch adapted to break the main electric circuit by closing the shunt trip of the circuit breaker after the lapse of a predetermined period of time, substantially as described.

17. Apparatus for the treatment of organic materials by X-rays, comprising a closed chamber having its walls impervious to X-rays, and containing a treatment chamber, with a tube chamber at one side thereof, with a partition highly permeable to X-rays separating the treatment chamber from the tube chamber, a door normally closing said treatment chamber, a plurality of X-ray tubes mounted in said tube chamber, a source of alternating current of electricity, transformers mounted in said tube chamber connected thereto, conductors from said transformers to said X-ray tubes, a circuit breaker located in the main low tension line and operated by overload, a shunt circuit for also operating said circuit breaker, and a switch automatically operated on the opening of the door for closing said shunt circuit, and an automatic time switch adapted to break the main electric circuit by closing the shunt trip of the circuit breaker after the lapse of a predetermined period of time, substantially as described.

18. Apparatus for the treatment of organic materials by X-rays, comprising a closed chamber having its walls impervious to X-rays, and containing a treatment chamber, with a tube chamber at one side thereof, with a partition highly permeable to X-rays separating the treatment chamber from the tube chamber, a door normally closing said treatment chamber, a plurality of X-ray tubes mounted in said tube chamber, a source of alternating current of electricity, transformers mounted in said tube chamber and connected thereto, conductors from said transformers to said X-ray tubes, a circuit breaker located in the main low tension line and operated by overload, a shunt circuit for also operating said circuit breaker, and a switch automatically operated on the opening of the door for closing said shunt circuit, with a relief switch mounted on the interior of said chamber and adapted to close said shunt circuit, and an automatic time switch adapted to break the main electric circuit by closing the shunt trip of the circuit breaker after the lapse of a predetermined period of time, substantially as described.

19. In an X-ray apparatus of the character described, the combination with a rigid metallic frame consisting of hollow piping, the said frame being composed of two members insulated from each other, a series of X-ray tubes mounted in pairs oppositely disposed having their high tension terminals connected relatively to the two members of said frame, and circuits for heating the filaments comprising respectively one of the members of said frame and an insulated cable passing through the hollow piping constituting said member of said frame, substantially as described.

20. In an X-ray apparatus of the character described, the combination with a rigid metallic frame consisting of hollow piping, the said frame being composed of two members insulated from each other, a series of X-ray tubes mounted in pairs oppositely disposed having their high tension terminals connected relatively to the two members of said frame, and circuits for heating the filaments comprising respectively one of the members of said frame, and an insulated cable passing through the hollow piping constituting said member of said frame, and a varying inductance interposed in each filament heating circuit, substantially as described.

21. In an X-ray apparatus of the character described, the combination with a rigid metallic frame consisting of hollow piping, the said frame being composed of two members insulated from each other, a series of X-ray tubes composed of two groups in multiple mounted in pairs oppositely disposed having their high tension terminals connected respectively to the two members of said frame, and having two circuits for heating the two groups of filaments each comprising respectively one of the members of said frame, and an insulated cable passing through the hollow piping constituting said member of said frame, substantially as described.

22. In an X-ray apparatus of the character described, the combination with a rigid metallic frame consisting of hollow piping, the said frame being composed of two members insulated from each other, a series of X-ray tubes composed of two groups in multiple mounted in pairs oppositely disposed having their high tension terminals connected respectively to the two members of said frame, and having two circuits for heating the two groups of filaments each comprising respectively one of the members of said frame, and an insulated cable passing through the hollow piping constituting said member of said frame, and a varying inductance interposed in each filament heating circuit, substantially as described.

23. In an X-ray apparatus of the character described, the combination with a source of alternating current of electricity, and a high tension transformer and two low tension transformers connected thereto, of a rigid metallic frame consisting of hollow piping, the said frame being composed of two members insulated from each other, and said members being connected, respectively, to the terminals of said high tension transformer, and each to one terminal of one low tension transformer, a series of X-ray tubes mounted in groups oppositely disposed and having their high tension terminals connected respectively to the two members of said frame, and circuits for heating the individual filaments comprising respectively one of the members of said frame, and an insulated cable passing through the hollow piping constituting said member of said frame, substantially as described.

24. In an X-ray apparatus of the character described, the combination with a source of alternating current of electricity, and a high tension transformer and two low tension transformers connected thereto, of a rigid metallic frame consisting of hollow piping, the said frame being composed of two members insulated from each other, and said members being connected, respectively, to the terminals of said high tension transformer, and each to one terminal of one low tension transformer, a series of X-ray tubes mounted in groups oppositely disposed and having their high tension terminals connected respectively to the two members of said frame, and circuits for heating the individual filaments comprising respectively one of the members of said frame, and an insulated cable passing through the hollow piping constituting said member of said frame, and varying inductance interposed in each filament heating circuit, substantially as described.

25. In an X-ray apparatus of the character described, the combination with a source of alternating current of electricity, and a high tension transformer and two low tension transformers connected thereto, of a rigid metallic frame consisting of hollow piping, the said frame being composed of two members insulated from each other, and said members being connected, respectively, to the terminals of said high tension transformer, and each to one terminal of one low tension transformer, a series of X-ray tubes mounted in groups oppositely disposed and having their high tension terminals connected respectively to the two members of said frame, and circuits for heating the individual filaments comprising respectively one of the members of said frame, and an insulated cable passing through the hollow piping constituting said member of said frame, and means for measuring the amount of current flowing through any individual tube of the system, substantially as described.

26. In an X-ray apparatus of the character described, the combination with a source of alternating current of electricity, and a high tension transformer and two low tension transformers connected thereto, of a rigid metallic frame consisting of hollow piping, the said frame being composed of two members insulated from each other, and said members being connected, respectively, to the terminals of said high tension transformer, and each to one terminal of one low tension transformer, a series of X-ray tubes mounted in groups oppositely disposed and having their high tension terminals connected respectively to the two members of said frame, and circuits for heating the individual filaments comprising respectively one of the members of said frame, and an insulated cable passing through the hollow piping constituting said member of said frame, a varying inductance interposed in each filament heating circuit, and means for measuring the amount of current flowing through any individual tube of the system, substantially as described.

27. In an X-ray apparatus of the character described, the combination with a source of alternating current of electricity, and a high tension transformer and two low tension transformers connected thereto, of a rigid metallic frame consisting of hollow piping, the said frame being composed of two members insulated from each other, and said members being connected, respectively, to the terminals of said high tension transformer, and each to one terminal of one low tension transformer, a series of X-ray tubes mounted in groups oppositely disposed and having their high tension terminals connected relatively to the two members of said frame, and circuits for heating the individual filaments comprising one of the members of said frame, and an insulated cable passing through the hollow piping constituting said member of said frame, means for measuring the amount of current flowing through any individual tube of the system, comprising a bus bar insulated from said frame, an ammeter connected to said bus bar and to said frame, a series of conducting strips normally connecting the high tension terminals of the individual tubes with said frame, and means for shifting each of said conducting strips from contact with said frame to contact with said bus bar, whereby the current passing through the individual tube is directed through the ammeter, substantially as described.

28. In an X-ray apparatus of the character described, the combination with a source of alternating current of electricity, and a high tension transformer and two low tension transformers connected thereto, of a rigid metallic frame consisting of hollow piping, the said frame being composed of two members insulated from each other, and said members being connected, respectively, to the terminals of said high tension transformer, and each to one terminal of one low tension transformer, a series of X-ray tubes mounted in groups oppositely disposed and having their high tension terminals connected respectively to the two members of said frame, and circuits for heating the individual filaments comprising respectively, one of the members of said frame, and an insulated cable passing through the hollow piping constituting said member of said frame, a varying inductance interposed in each filament heating circuit, and means for measuring the amount of current flowing through any individual tube of the system, comprising a bus bar insulated from said frame, an ammeter connected to said bus bar and to said frame, a series of conducting strips normally connecting the high tension terminals of the individual tubes with said frame, and means for shifting each of said conducting strips from contact with said frame to contact with said bus bar, whereby the current passing through the individual tube is directed through the ammeter, substantially as described.

29. In an X-ray apparatus of the character described, the combination with a rigid metallic frame consisting of hollow piping, the said frame being composed of two members insulated from each other, and set at an obtuse angle to each other, a series of X-ray tubes composed of two groups in multiple mounted on said frame in pairs oppositely disposed and having their high tension terminals connected respectively to the two members of said frame, and having two circuits for heating the two groups of filaments each comprising respectively one of the members of said frame, and an insulated cable passing through the hollow piping, constituting said member of said frame, substantially as described.

30. In an X-ray apparatus of the character described, the combination with a rigid metallic frame consisting of hollow piping, the said frame being composed of two members insulated from each other, and set at an obtuse angle to each other, a series of X-ray tubes composed of two groups in multiple mounted on said frame in pairs oppositely disposed and having their high tension terminals connected respectively to the two members of said frame, and having two circuits for heating the two groups of filaments each comprising respectively one of the members of said frame, and an insulated cable passing through the hollow piping constituting said member of said frame, and a varying inductance interposed in each filament heating circuit, substantially as described.

31. In an X-ray apparatus of the character described, the combination with a main conductor frame connected to the high tension terminals of the X-ray tube, of means for measuring the amount of current flowing through any individual tube of the system, comprising a bus bar insulated from said frame, an ammeter connected to said bus bar and to said frame, a series of conducting strips normally connecting the high tension terminals of the individual tubes with said frame, and means for shifting each of said conducting strips from contact with said frame to contact with said bus bar, whereby the current passing through the individual tube is directed through the ammeter, substantially as described.

32. In an X-ray apparatus of the character described, the combination with a group of X-ray tubes mounted in multiple and having their filament heating circuits also in multiple, of a varying inductance in series with the filament heating circuit of each tube, substantially as described.

33. In an X-ray apparatus of the character described, the combination with a group of X-ray tubes mounted in multiple and having their filament heating circuits also in multiple, of a varying inductance in series with the filament heating circuit of each tube, and means for measuring the high tension current passing through each tube when desired, substantially as described.

34. In an X-ray apparatus of the character described, the combination with a group of X-ray tubes mounted in multiple and having their filament heating circuits also in multiple, of a varying inductance in series with the filament circuit of each tube, and means for measuring the high tension current passing through each tube, said means comprising an ammeter normally out of circuit with the entire group of tubes, and means for directing the current of any particular tube through said ammeter when desired, substantially as described.

In testimony whereof I affix my signature.

DAVID COLLINS GILLETT.